Feb. 2, 1960 J. H. WOODWORTH 2,923,916
MARINE SEISMIC TRANSDUCER SYSTEM
Filed April 1, 1957 2 Sheets-Sheet 1

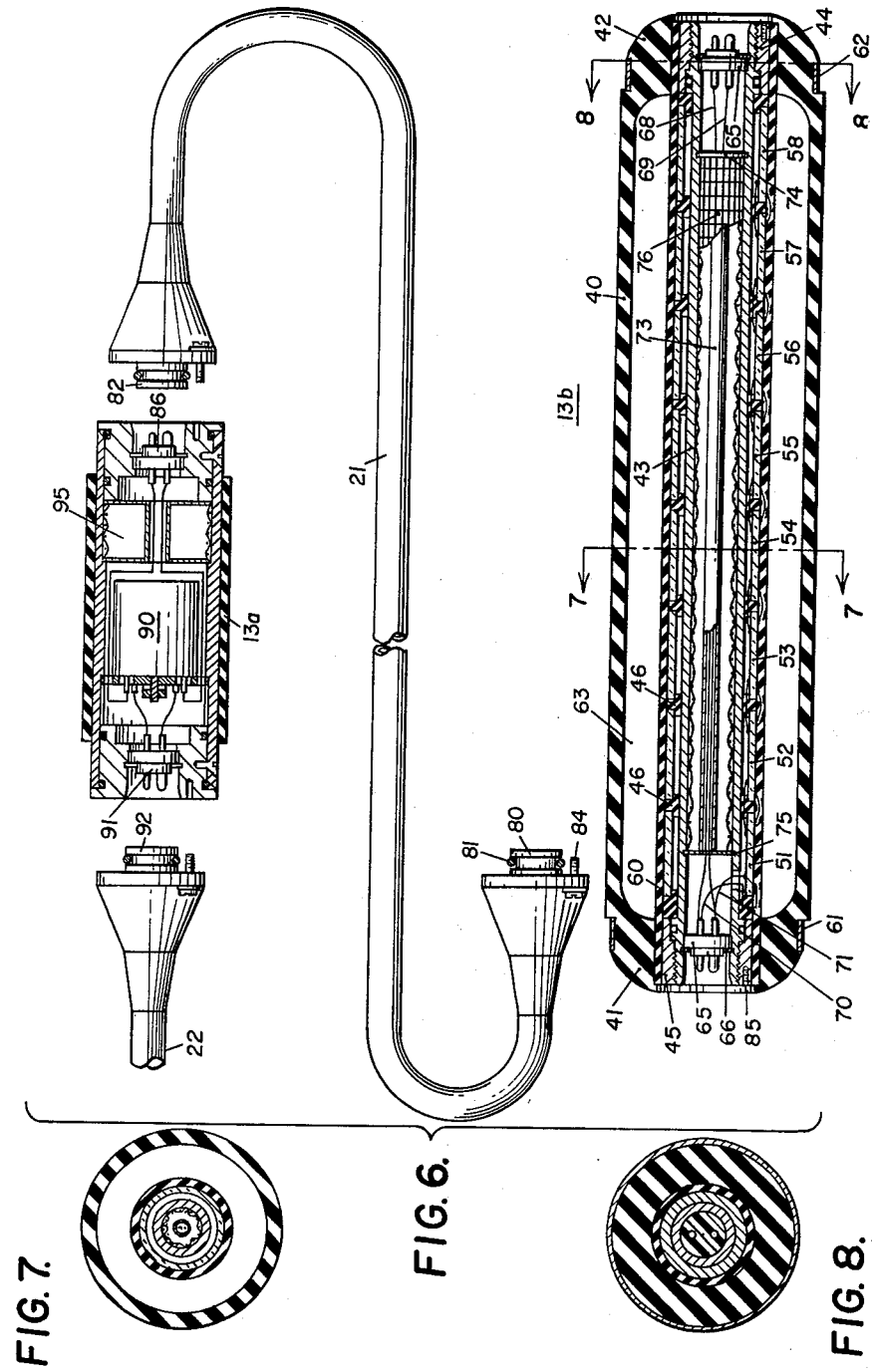

United States Patent Office 2,923,916
Patented Feb. 2, 1960

2,923,916

MARINE SEISMIC TRANSDUCER SYSTEM

John H. Woodworth, Dallas, Tex., assignor, by mesne assignments, to Socony Mobil Oil Company, Inc., New York, N.Y., a corporation of New York Application April 1, 1957, Serial No. 649,941

10 Claims. (Cl. 340—17)

This invention relates to a marine seismic system and more particularly to a highly sensitive, high impedance detector. In seismic exploration over water-covered areas it has been the practice to tow seismometers from a seismic recording boat along a predetermined traverse. The periodic detonation of an explosive charge at successive points along the traverse permits rapid and yet detailed coverage of an area. From the seismograms thus obtained the attitude and character of terrestrial subsurface structures may be determined.

The seismic detectors employed in such systems are necessarily delicate and highly sensitive in order to produce a voltage representative of seismic energy reflected from deep reflecting horizons. At the same time the detectors together with associated cable equipment must withstand manipulations encountered when payed out from the boat and when reeled into the boat.

In addition, it is frequently necessary to alter both the sensitivity and the frequency response of the detecting system.

It is an object of the present invention to provide a transducer system which is adaptable to marine operations and which is of sensitivity sufficient to permit the detection of faint seismic signals with the rejection of noises introduced by ocean motions, such motions being detrimental to record quality when using motion-sensitive "seismic" detectors.

A further objective is to provide for rapid change in both sensitivity and frequency response.

A further objective is to provide a hydrophone which responds to only the pressure component of the seismic reflection signal and which will be sufficiently rugged to withstand severe handling.

For a more complete understanding of the present invention and for further objects and advantages thereof, reference may now be had to the following description taken in conjunction with the accompanying drawings in which:

Fig. 6 is a segmented view of one transducer and an impedance matching unit with an interconnecting cable;

Fig. 7 is a view taken along the line 7—7 of Fig. 6; and

Fig. 8 is a sectional view taken along the line 8—8 of Fig. 6.

Figure 1:
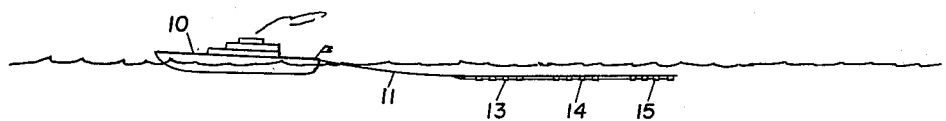
Fig. 1 illustrates a marine operation.
Figure 2:
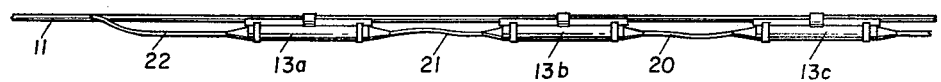
Fig. 2 is a segment of the cable of Fig. 1 including two detectors and an impedance matching unit.
Figure 4:
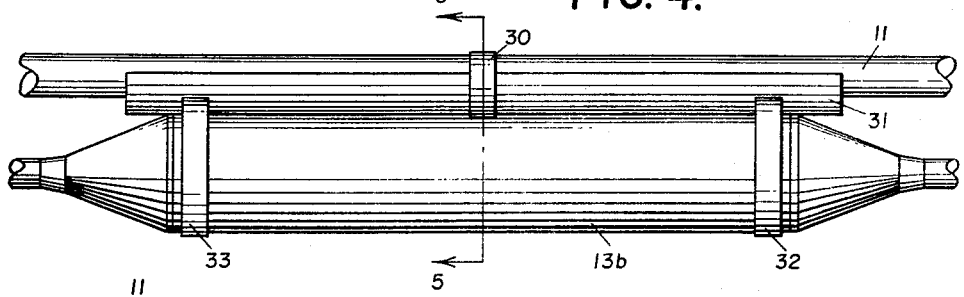
Fig. 4 is an enlarged view of one detector secured to a marine cable.
Figure 3:
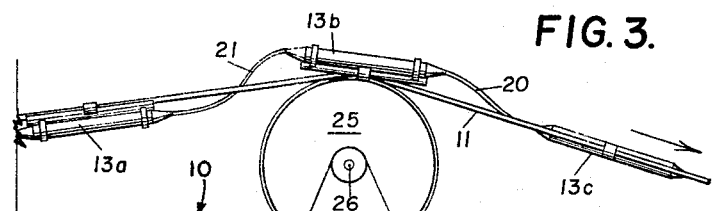
Fig. 3 illustrates the units of Fig. 2 as they are payed out from the back of a boat.

Referring now to Fig. 1, there is illustrated a boat 10 from which there depends a cable 11 having attached thereto a plurality of clusters of seismic detectors 13, 14 and 15. Each of the clusters 13, 14 and 15 includes one or more transducers and an impedance matching or transformer section. As shown in the enlarged Figs. 2 and 3, the seismometers 13b and 13c are interconnected with cable 20. A cable 21 connects the seismometer 13b to an impedance matching unit 13a which in turn is connected by cable 22 to the main cable or line 11. Cable 11 preferably includes a strain element to provide requisite strength for towing and also includes a plurality of signal channels for transmitting signals to the boat 10. As shown in Fig. 3, cable 11 passes over a drum 25 mounted on shaft 26 at the stern 27 of boat 10. The seismometer 13b is so secured over cable 11 in accordance with the present invention that it may pass over drum 25 without damage thereto even though the detector itself is an elongated rigid member. While the internal structure of the transducer will be explained in connection with Figs. 6–8, the manner in which the transducers are secured to the cable 11 is shown in Fig. 4. A strap 30 encompasses a secondary resilient supporting strip 31. Strip 31, in a form found to be satisfactory, comprised a strip of heavy rubber hose slit longitudinally to provide an elongated half cylinder slightly greater in length than the seismometer 13b. The strap 30 secures the secondary member 31 to cable 11 at the mid-point thereof coaxially with said cable and in an encompassing relation. Additional straps 32 and 33 are threaded through slots in the lower portion of the member 31 and extend around the seismometer 13b adjacent the ends thereof.

Figure 5:
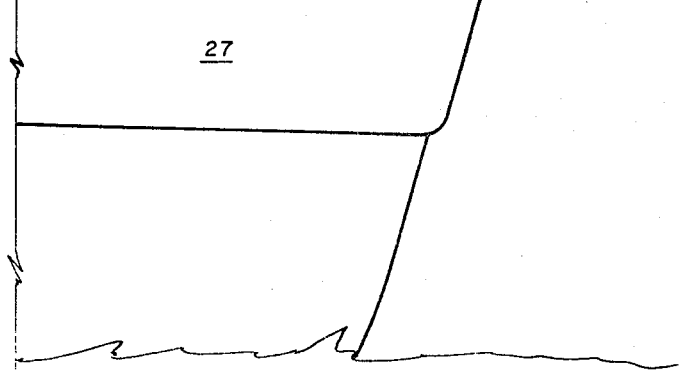
Fig. 5 is a sectional view of Fig. 4 taken along the line 5—5 of Fig. 4.

As illustrated in Fig. 5, strap 30 clamps the member 31 onto the side of cable 11 with strap 33 securing the transducer 13b thereto. With this arrangement when cable 11 passes over drum 25, Fig. 3, the single point coupling to the cable 11 permits the cable to follow the arcuate surface of the drum 25 while maintaining transducer 13b free from bending stresses.

Referring now to Figs. 6–8, various sectional views of transducer 13b have been illustrated along with transformer unit 13a. Where consistent, like parts have been given the same reference characters as in Figs. 1–5.

Transducer 13b comprises an elongated, cylindrical, rubber housing 40 having integrally molded end portions 41 and 42 of substantially greater wall thickness. Housing 40 provides resilience to enable the transducer to survive shocks encountered in handling cables. A rigid cylinder such as a metallic tube 43 extends through the housing 40 and into openings formed in the molded end portions 41 and 42. The tube 43 is fitted at the ends thereof with short cylinders 44 and 45 which are threaded internally as to engage the threaded ends of tube 43.

A plurality of insulating spacers 46 are positioned at spaced points along the length of tube 43, each such spacer being provided with a base section which contacts the surface of tube 43 and a radial extension at the center thereof whereby shoulders are provided on spacers 46 to support a plurality of short piezoelectric cylinders. In the unit illustrated eight crystal transducer cylinders 51–58 are mounted on insulating spacers 46 positioned at points along tube 43. An outer jacket 60 is molded around cylinders 51–58 and also encompasses the metallic end cylinders 44 and 45. Clamping rings 61 and 62 are provided to seal the annular space 63 between jacket 60 and housing 40 from the entry of water. Plug elements 65 are fitted inside tube 43 and are locked therein as by snap rings 66. The contacts or terminals on one of the plugs 65 are interconnected with associated terminals on the other plug 65 by conductors 68 and 69 extending through tube 73. Conductor 68 is connected by way of lead 70 to a terminal on the exterior surface of cylinder 51. Similarly, conductor 69 is connected by lead 71 to a terminal or plate contacting the interior surface of cylinder 51. Jumpers are then provided between cylinders 51 and 52 and between cylinders 52 and 53, etc. to connect all of cylinders 51–58 in parallel.

The zone or space 63 in the annulus between jacket 60 and housing 40 is filled with a non-conductive fluid such as castor oil acoustically to couple the acoustic detector elements 51–58 to the medium outside the housing 40. Jacket 60, being bonded in a liquid-tight fashion to the end members 44 and 45, provides a secondary barrier between conductive liquids, such as sea water, and the high impedance detecting crystals 51–58. Thus, even if the jacket 40 may be punctured permitting entry of sea water, operations may continue. The impedance level in the region of the crystals 51–58 is unaffected. Units thus damaged may readily be repaired by merely removing straps 61 and 62 and discarding the punctured jacket 40 and replacing it with a new jacket. The cavity 63 is then refilled with a suitable liquid.

Also provided in the transducer 13b is a desiccator unit which includes a central tube 73 through which the conductors 68 and 69 are threaded. End disks 74 and 75 are provided to support a mesh cylinder 76. The zone between tube 73 and the mesh cylinder 76 is filled with desiccating crystals which dry any water vapor or moisture from the zone inside the crystal cylinders 51–58. It is to be noted that an opening in the tube 43 is provided to pass leads 70 and 71 and to provide communication between the desiccating unit and the detecting crystal zone inside the covering or jacket 60.

Since the detecting units formed by cylinders 51–58 are high impedance elements, it is necessary that they may be maintained free of moisture. The means thus described and provided has been found suitable for such purposes.

Cable 21 is adapted to be coupled to the end of transducer 13b. The end portion 80 provided with an O-ring 81 is adapted to be inserted into the end of transducer unit 13b. Contacts in the end member 80 are adapted to receive the terminals mounted on one of the plugs 65 to complete a circuit to a similar element 82 at the other end of cable 21. The cable 21 may be secured to the end of transducer 13b as by a plurality of screws such as screw 84 which is received in threaded recesses such as recess 85 in the sleeve 45.

The high impedance circuit extending through cable 21 is terminated at high impedance terminals of a transformer 90 which is mounted in the transformer unit 13a. The termination may be varied to adjust frequency response. Transformer 90 in one embodiment had an output line impedance of 125 ohms and an input impedance selectable at levels of 25K, 40K, 50K and 75K ohms. Thus, if a single detector unit such as hydrophone 13b were sufficient to give the desired signal level, the taps on transformer 90 would be so selected that the frequency response of the unit comprises the transformer and the single detector 13b would be suitable for the purposes desired. In refraction surveying it would be desired that such frequency response be characterized by emphasis of the low frequency energy whereas other operations would dictate an impedance selection on the transformer 90 which would emphasize high frequencies. Similarly, if two, three, or more transducers were connected in parallel to a given transformer, a different terminal would be selected at the input thereof.

Plug 82 is adapted to contact terminals in plug 86. Conductors then extend from the latter terminals to the transformer input terminals. A low impedance circuit then is connected from transformer 90 to terminals in plug 91 at the end of unit 13a opposite plug 86. Cable 22 which is then provided with an end member 92 is adapted to contact the terminals on plug 91 whereby a low impedance circuit may be completed through conductor 22 to cable 11. Unit 13a is provided with a chamber 95 which is filled with desiccating crystals and thereby maintains unit 13a free from moisture, thus permitting retention of high impedance in the circuit leading from crystals 51–58.

In the foregoing description it will be seen that there is provided a hydrophone unit in which an elongated detector structure is provided with a single point mechanical coupling to a marine cable. A separate electrical coupling is provided. The transducer comprises a liquid-filled flexible outer sheath for protecting the rigid crystal structure from abuse. An inner jacket is provided coextensive in length with the resilient sheath and immediately adjacent the rigid crystal structure to maintain high, by employing desiccating means, the impedance in the region of the detector itself.

While the invention has been described in connection with certain specific embodiments thereof, it will now be understood that further modifications will suggest themselves to those skilled in the art and it is intended to cover such modifications as fall within the scope of the appended claims.

What is claimed is:

1. A hydrophone for marine seismic exploration comprising a transducer including an elongated, rigid, cylindrical detector, a flexible cable for towing said hydrophone through the water and including circuit means, a signal channel including a circuit extending from said transducer to said circuit means in said cable, and means for coupling said hydrophone parallel with and on the side of said cable at a point midway along the length of said hydrophone.

2. A hydrophone for a marine seismic system comprising an elongated, flexible housing having a rigid tube extending therethrough, a piezo-electric cylinder mounted on said tube, a cable, a signal circuit extending from said cylinder to said cable, and means for securing said hydrophone parallel with and on the side of said cable at a point intermediate the ends of said hydrophone.

3. A hydrophone for a marine seismic system comprising a marine cable, an elongated, flexible housing having a rigid tube extending therethrough, a rigid detecting cylinder responsive to pressure variations mounted on said tube, a waterproof jacket encompassing said detecting cylinder coextensive in length with said housing, means for securing the ends of said housing, said jacket, and said cylinder together, a fluid disposed within the zone between said housing and said jacket, and means for securing said hydrophone parallel with and on the side of said cable at a single point intermediate the ends of said hydrophone.

4. In a seismic detecting system the combination comprising a cable having a signal circuit, an elongated flexible housing having rigid end elements, rigid means extending through said housing and interconnecting said end elements, a plurality of cylindrical piezo-electric transducers supported by said rigid means, a non-conductive liquid in said housing adapted acoustically to couple said transducers to a medium outside said housing, desiccator means within said housing to maintain moisture-free the zone occupied by said transducers, conductors extending between said end elements, a circuit extending from a selected pair of said conductors to said piezo-electric transducers to connect them in parallel, means mechanically coupling said housing to said cable parallel with and on the side of said cable at a point midway along said housing, and means including impedance matching means electrically interconnecting one of said end elements to said signal circuit.

5. In a marine seismic system the combination which comprises an elongated, cylindrical, flexible housing means, a rigid center member extending through at least a portion of said housing means and having a central chamber, a high impedance detector mounted in said housing means and supported by said rigid center member, an impervious jacket encompassing said detector and secured at the ends thereof to said housing means and to said center member, a non-conductive liquid in said housing means acoustically to couple said detector to the medium outside said housing means, an impedance transforming means adjacent said detector for matching the high impedance of said detector to a low line impedance, and desiccator means within said chamber of said rigid center member to maintain high the impedance of said detector.

6. In a marine seismic system the combination which comprises an elongated, cylindrical, flexible housing, a rigid center member extending through said housing and having a central chamber, a high impedance detector mounted in said housing and supported by said rigid center member, an impervious jacket encompassing said detector and secured at the ends thereof to said housing and to said center member, a non-conductive liquid within said housing and outside said jacket acoustically to couple said detector to the medium outside said housing, and desiccator means within said chamber to maintain high the impedance of said detector.

7. In a system for marine seismic exploration the combination comprising a transducer including an elongated, rigid, cylindrical detector, a flexible cable for towing said transducer through the water and including circuit means, a signal channel including a circuit extending from said transducer to said circuit means in said cable, an intermediate element mechanically coupled at a midpoint to said cable and adapted to engage said cable at points adjacent said midpoint to maintain said element parallel with said cable in the region of said midpoint, and means mechanically coupling the ends of said element to the ends of said transducer.

8. A hydrophone for marine seismic exploration comprising a transducer including an elongated, rigid, cylindrical detector, a flexible cable for towing said hydrophone through the water and including circuit means, a signal channel including a circuit extending from said transducer to said circuit means in said cable, and a resilient half cylinder disposed coaxially with said cable and coupled at the ends thereof to the ends of said transducer and at a midpoint to said cable thereby to avoid bending of said transducer by said flexible cable.

9. In a seismic exploration system the combination comprising a hydrophone including an elongated cylindrical housing having flexible walls and substantially rigid end portions, a rigid tube extending through said housing and coupled at the ends thereof to the ends of said housing, cylindrical detector means mounted on said tube, a marine cable, a signal circuit extending from said detector means to said cable, an elongated element, means for rigidly securing said element at midpoint thereof to said cable and for maintaining said element parallel to said cable at said point, and means for coupling said housing at the ends thereof to the ends of said element.

10. In a seismic exploration system the combination comprising a hydrophone including an elongated cylindrical housing having flexible walls and substantially rigid end portions, a rigid tube extending through said housing and coupled at the ends thereof to the ends of said housing, cylindrical detector means mounted on said tube, a marine cable, a signal circuit extending from said detector means to said cable, an elongated element of half cylindrical configuration, means for securing said element at midpoint thereof in an encompassing relation on said cable, and means for coupling said housing at the ends thereof to the free ends of said element.

References Cited in the file of this patent

UNITED STATES PATENTS

| | | |
|---|---|---|
| 2,404,786 | Bostwick | July 30, 1946 |
| 2,568,680 | Frowe | Sept. 18, 1951 |
| 2,708,742 | Harris | May 17, 1955 |
| 2,732,536 | Miller | Jan. 24, 1956 |
| 2,783,449 | Loofbourrow | Feb. 26, 1957 |
| 2,790,964 | Schurman | Apr. 30, 1957 |